No. 617,935. Patented Jan. 17, 1899.
L. L. NICHOLS.
RUNNING GEAR FOR VEHICLES.
(Application filed Oct. 14, 1898.)
(No Model.)

WITNESSES: Edward Thorpe

INVENTOR Lafayette L. Nichols
BY
ATTORNEYS.

UNITED STATES PATENT OFFICE.

LAFAYETTE LOVEL NICHOLS, OF INVERNESS, FLORIDA.

RUNNING-GEAR FOR VEHICLES.

SPECIFICATION forming part of Letters Patent No. 617,935, dated January 17, 1899.

Application filed October 14, 1898. Serial No. 693,511. (No model.)

*To all whom it may concern:*

Be it known that I, LAFAYETTE LOVEL NICHOLS, of Inverness, in the county of Citrus and State of Florida, have invented a new and Improved Running-Gear for Vehicles, of which the following is a full, clear, and exact description.

The object of the invention is to provide a simple, economic, and durable connection between the reach of a vehicle and the forward axle and bolster without the aid of a kingbolt, and, furthermore, to so effect the connection that all the advantages of a fifth-wheel will be obtained and the running-gear will be rendered stronger than under the usual construction.

Another object of the invention is to provide a coupling that will admit of the use of a long or of a short reach, as may be required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
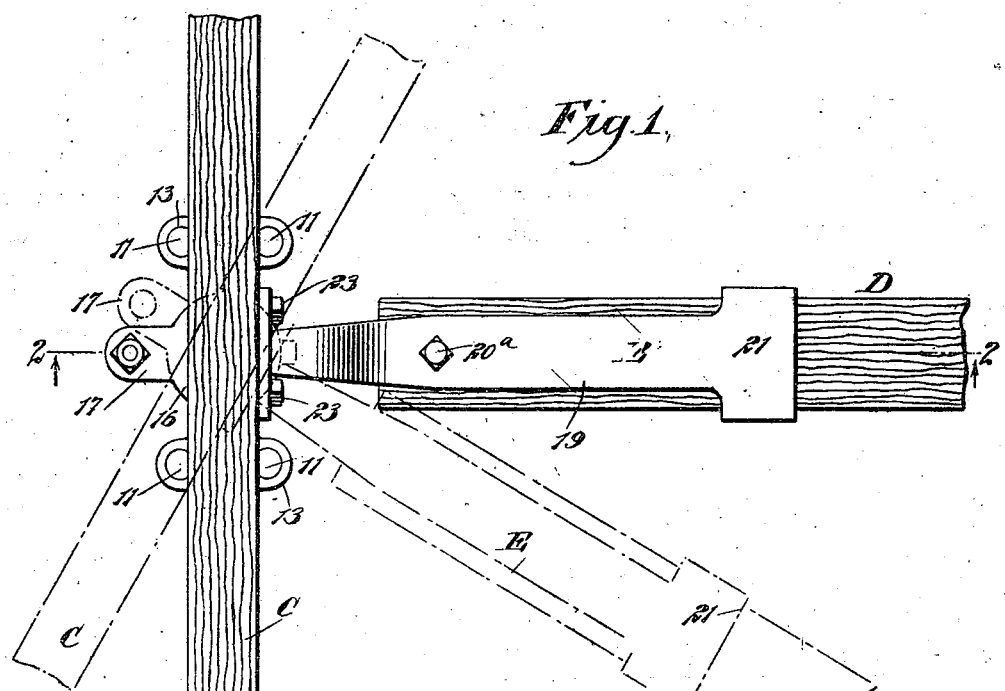
Figure 2:
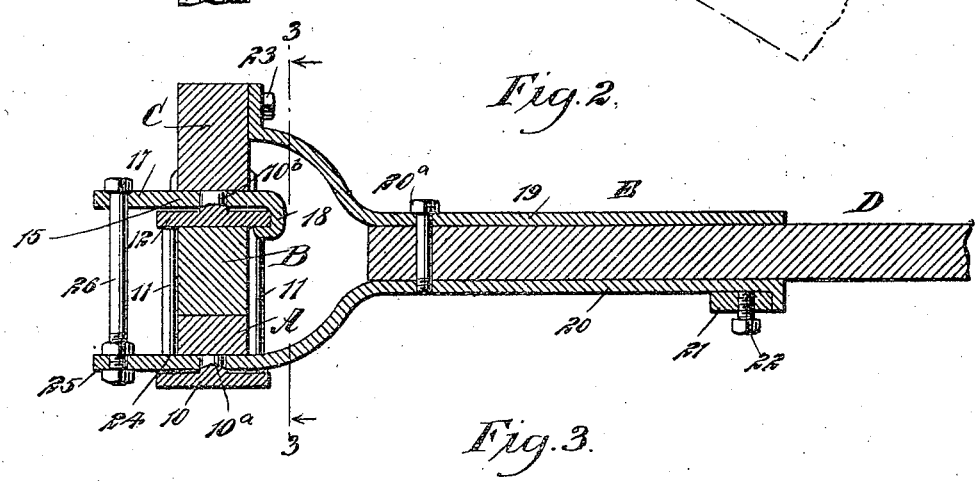
Figure 3:
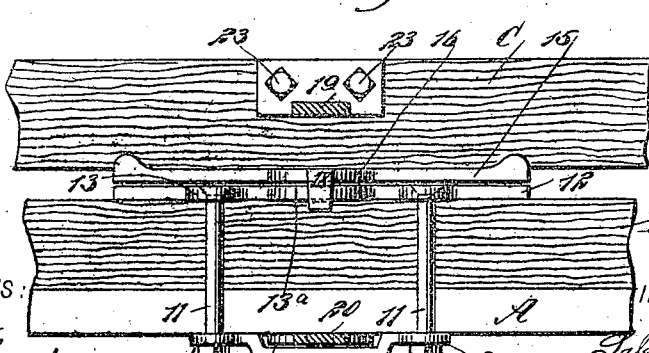

Figure 1 is a plan view of a portion of the forward bolster, axle, axle-stock, and reach of a vehicle, illustrating the application of the improvement thereto. Fig. 2 is a longitudinal vertical section taken practically on the line 2 2 of Fig. 1, and Fig. 3 is a vertical transverse section taken practically on the line 3 3 of Fig. 2.

A represents the forward axle of the running-gear of a vehicle; B, the axle-stock; C, the front bolster, and D the forward portion of the reach. A stirrup 10 is located below the axle at its center, and the said stirrup 10 is connected by bolts 11 or their equivalents with a wear-plate 12, which plate is located upon the upper central portion of the axle-stock B. The wear-plate 12 and stirrup 10 are provided with offsets at the front and at the rear, the offsets from the wear-plate being designated as 13 and the offsets from the stirrup as 14. A plate 15 is secured upon the central under portion of the front bolster C, and the central portion 16 of the plate 15 is of disk-like formation, as is likewise the corresponding portion 13ª of the wear-plate 12, so that when the disk sections 13ª and 16 of the two plates 12 and 15 are brought one over the other the two plates serve the same purpose as a fifth-wheel.

A horizontal forward projection 17 is provided for the disk section 16 of the upper plate 15, and at the rear of the disk section a curved lip 18 is located, which is shaped to receive the rear edge of the disk section 13ª of the wear-plate 12, thus giving the upper plate 15 guided movement upon the wear-plate 12.

A socket E is provided for the forward end of the reach D. This socket preferably consists of an upper strap member 19, provided at its rear end with a loop or an eye 21, and a lower strap member 20, which lower strap member is passed through the eye and is carried downward to engage with the rear edge of the eye, as shown best in Fig. 2. The strap members 19 and 20 of the socket E engage, respectively, with the top and bottom portions of the reach D and are secured thereto by one or more bolts 20ª, while a set-screw 22 is passed through the eye 21 to engage with the bottom member 20 of the socket, as is also shown in Fig. 2. The forward end of the upper strap member 19 is curved in an upwardly direction and is attached by bolts 23 or their equivalents to the rear face of the central portion of the bolster C, as shown in Figs. 1 and 2, while the corresponding end of the lower strap member 20 of the said socket E is curved in a downwardly direction and is carried between the axle A and the stirrup 10, that portion of the member 20 of the socket that is located within the stirrup 10 being circular or of disk formation, and the said disk section of the socket E receives a pivot-stud 10ª, which extends upward from the upper face of the stirrup 10, as shown in Fig. 2, while a similar pivot-stud 10ᵇ is projected upward from the disk portion of the wear-plate 12 and enters a suitable opening in the corresponding portion of the bolster-plate 15, as is also shown in Fig. 2.

The disk section of the socket E is designated as 24 and is best shown in Fig. 3, and from this section of the socket a projection 25 is horizontally and forwardly carried, and the projection 25 is connected by a bolt 26 with the projection 17 from the bolster-plate.

the projection 17 being located immediately over the projection 25.

It is evident that a reach of any desired length may be secured in the socket E and that the reach may be attached to the rear bolster or axle of the vehicle in the customary manner. It is furthermore evident that the forward bolster C may turn upon the axle-stock, the reach moving with the bolster, and that the movement of the bolster and reach is limited by the lip 18 engaging with the rear edge of the wear-plate 12 at each side of its central or disk section 13ª and likewise by reason of the bolt 26 engaging with corresponding portions of the said wear-plate 12 at the front. It is also evident that a construction such as has been described will add materially to the strength of the running-gear of the vehicle and that the connections provided are exceedingly simple, durable, and economic.

Having thus described my invention, I claim as new and desire to secure by Letters Patent—

1. The combination of a reach, an axle, a bolster mounted on the axle, a stirrup located at the under side of the axle and provided with an upwardly-extending stud, a wear-plate mounted on the top of the axle and provided with an upwardly-extended stud, the wear-plate having a circular central portion, a socket attached to the reach and having a lower member passed between the stirrup and axle, the lower member being provided with an orifice receiving the stud of the stirrup, and the socket having an upper member attached to the bolster, an additional plate mounted on the wear-plate and having an opening receiving the stud thereof, the rear end of the said additional plate being formed with a curved lip engaging the circular portion of the wear-plate, and a draft-bolt passing vertically between the front extremity of the lower member of the socket and the front extremity of the said additional plate.

2. In a running-gear, the combination of a socket adapted to be attached to the reach, the socket having an upper and lower member, a bolster to which the upper member of the socket is joined, an axle, a stirrup attached to the under side of the axle and having pivotal connection with the lower member of the socket, a wear-plate attached to the upper side of the axle, an additional plate having pivotal connection with the wear-plate, and a draft-bolt running between the wear-plate and the lower member of the socket.

LAFAYETTE LOVEL NICHOLS.

Witnesses:
WILLIAM F. BARRETT,
HERMAN J. KOERNER.